United States Patent
Lackey et al.

(10) Patent No.: US 7,450,835 B2
(45) Date of Patent: Nov. 11, 2008

(54) TRIPOD DEVICE FOR MOUNTING A CAMERA AND TRACKING MOVABLE OBJECTS

(76) Inventors: Robert C. Lackey, 6511 Old Monroe Rd., Indian Trail, NC (US) 28079; James K. Newsome, 6433 Old Monroe Rd., Indian Trail, NC (US) 28079

( * ) Notice: Subject to any disclaimer, the term of this patent is extended or adjusted under 35 U.S.C. 154(b) by 365 days.

(21) Appl. No.: 11/300,037

(22) Filed: Dec. 14, 2005

(65) Prior Publication Data

US 2007/0133979 A1     Jun. 14, 2007

(51) Int. Cl.
   *G03B 17/00*   (2006.01)
   *G03B 15/00*   (2006.01)
   *H04N 5/232*   (2006.01)

(52) U.S. Cl. .................. 396/58; 396/428; 348/169; 348/211.2; 348/211.6

(58) Field of Classification Search .................. 396/58, 396/428; 348/169–172, 211.2, 211.6
See application file for complete search history.

(56) References Cited

U.S. PATENT DOCUMENTS

| | | | |
|---|---|---|---|
| 4,067,015 A | 1/1978 | Mogavero et al. | |
| 4,655,567 A * | 4/1987 | Morley | 352/243 |
| 4,905,315 A | 2/1990 | Solari et al. | |
| 4,980,871 A | 12/1990 | Sieber et al. | |
| 5,073,824 A | 12/1991 | Vertin | |
| 5,268,734 A | 12/1993 | Parker et al. | |
| 5,668,629 A | 9/1997 | Parker et al. | |
| 5,995,763 A * | 11/1999 | Posa et al. | 396/57 |
| 6,108,035 A * | 8/2000 | Parker et al. | 348/169 |
| 7,140,789 B1 * | 11/2006 | Reinert | 396/428 |

* cited by examiner

*Primary Examiner*—W. B. Perkey
(74) *Attorney, Agent, or Firm*—Dale J. Ream

(57) ABSTRACT

A tripod device and system for mounting a camera and tracking movable objects includes a base with a camera mount, a processor, a user interface, actuators for rotating and tilting the camera mount, and a plurality of pendants. Each pendant includes a transmitter for transmitting a unique signal for receipt by a receiver in communication with the processor. The processor includes programming for determining the direction of a signaling pendant and for moving the camera mount to follow a selected pendant. The user interface enables a user to select a mode of operation, such as tracking a selected pendant, alternating between two or more pendants, or facing an area having the most pendants. Each pendant includes a receiver and a visual indicator for indicating when it is the active subject pendant. This invention provides for taping a birthday party having multiple persons to be taped according to selected modes.

15 Claims, 11 Drawing Sheets

TRIPOD DEVICE FOR MOUNTING A CAMERA AND TRACKING MOVABLE OBJECTS

BACKGROUND OF THE INVENTION

This invention relates generally to devices for videotaping movable objects and, more particularly, to a tripod device and system for videotaping children at parties or family gatherings according to user selected modes.

Videotaping children at family or birthday gatherings and celebrations is a popular and desirable way to preserve such events for later viewing and enjoyment. However, such videotaping prevents the person operating the camera from fully enjoying the live event and often results in confusing or hurried movement between persons who are the subject of the taping. This may result in some children being neglected from taping while others are repeatedly recorded.

Various devices and systems have been proposed in the art for automatically tracking the position of a movable object so that a video camera can continuously capture a movable object. While assumably effective for their intended purposes, the existing devices and systems do not allow a user to select from multiple modes of operation, do not provide for the wearer of an interactive pendant to override a previously selected mode, and do not provide a visual indicator of which pendant (associated with a movable object) is the current taping target.

Therefore, it would be desirable to have a tripod-mounted device that enables multiple children or other attendees of a gathering to be tracked and videotaped selectively, sequentially, as a group, or according to other modalities. Further, it would be desirable to have a device and system having a user interface for selecting taping modes. In addition, it would desirable to have multiple pendants to be worn by "taping targets" that indicate when target is the subject of taping and which allow that target to override a previously selected taping mode.

SUMMARY OF THE INVENTION

A tripod device and system for mounting a camera and tracking movable objects according to the present invention includes a base and camera mount for supporting a camera. The device includes a processor and actuators for selectively rotating and tilting the camera mount. The invention further includes a plurality of pendants separate from the base, each pendant including a transmitter for transmitting unique signals. A receiver is in communication with the processor for receiving signals from the pendants and communicating these signals to the processor. The processor includes programming for determining which pendants are transmitting signals and from which direction.

The tripod device and system further includes a user interface for selecting between several modes of operation, including following a single selected pendant, scanning between two or more selected pendants, or concentrating on an area having the largest number of pendants. The processor communicates with the actuators to appropriately move the camera mount position to effectively track the appropriate pendant or pendants.

Each pendant may be clipped, strapped, or otherwise worn by a person to be taped, e.g. a child. Each pendant includes a receiver for receiving signals from a signal transmitter controlled by the processor. Each pendant also includes an indicator such as a light so as to indicate when that particular pendant is the subject of the taping. This will alert the child to speak or otherwise respond to the camera if he so desires.

Therefore, a general object of this invention is to provide a tripod device and system for mounting a camera and tracking movable objects.

A particular object of this invention is to provide a tripod device, as aforesaid, for tracking and taping selected children at a birthday party or family gathering.

Another object of this invention is to provide a tripod device, as aforesaid, having a plurality of pendants wearable by children or other "taping targets".

Yet another object of this invention is to provide a tripod device, as aforesaid, having a user interface for selecting between various modes of tracking and taping operation.

Still another object of this invention is to provide a tripod device, as aforesaid, having a processor in communication with rotational and tilt actuators for moving a camera mount to follow selected pendants according to a selected mode.

A further object of this invention is to provide a tripod device, as aforesaid, for selectively tracking a single pendant, alternating between two or more pendants, or concentrating on an area having the most pendants.

A still further object of this invention is to provide a tripod device, as aforesaid, in which each pendant includes an indicator for indicating when it is the active target being tracked.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 3a is a front view on a reduced scale of the tripod device as in FIG. 1;

FIG. 3b is a sectional view of the tripod device taken along line 3b-3b of FIG. 3a;

FIG. 4b is an isolated view on an enlarged scale taken from FIG. 4a;

FIG. 8b is a sectional view of the pendant taken along line 8b-8b of FIG. 8a;

FIG. 11b is a bottom view of the pendant as in FIG. 11a.

DESCRIPTION OF THE PREFERRED EMBODIMENT

A tripod device 100 according to the present invention will now be described in detail with reference to FIGS. 1 through 11b of the accompanying drawings. More particularly, a tripod device 100 according to the current invention includes a base 110 adjacent a camera mount 120 for selectively supporting a camera 10, as shown in FIGS. 1 through 3b. "Tripod" as used herein denotes a camera-supporting device and does not indicate a number of legs (or even the presence of legs) on the camera-supporting device.

Figure 1:
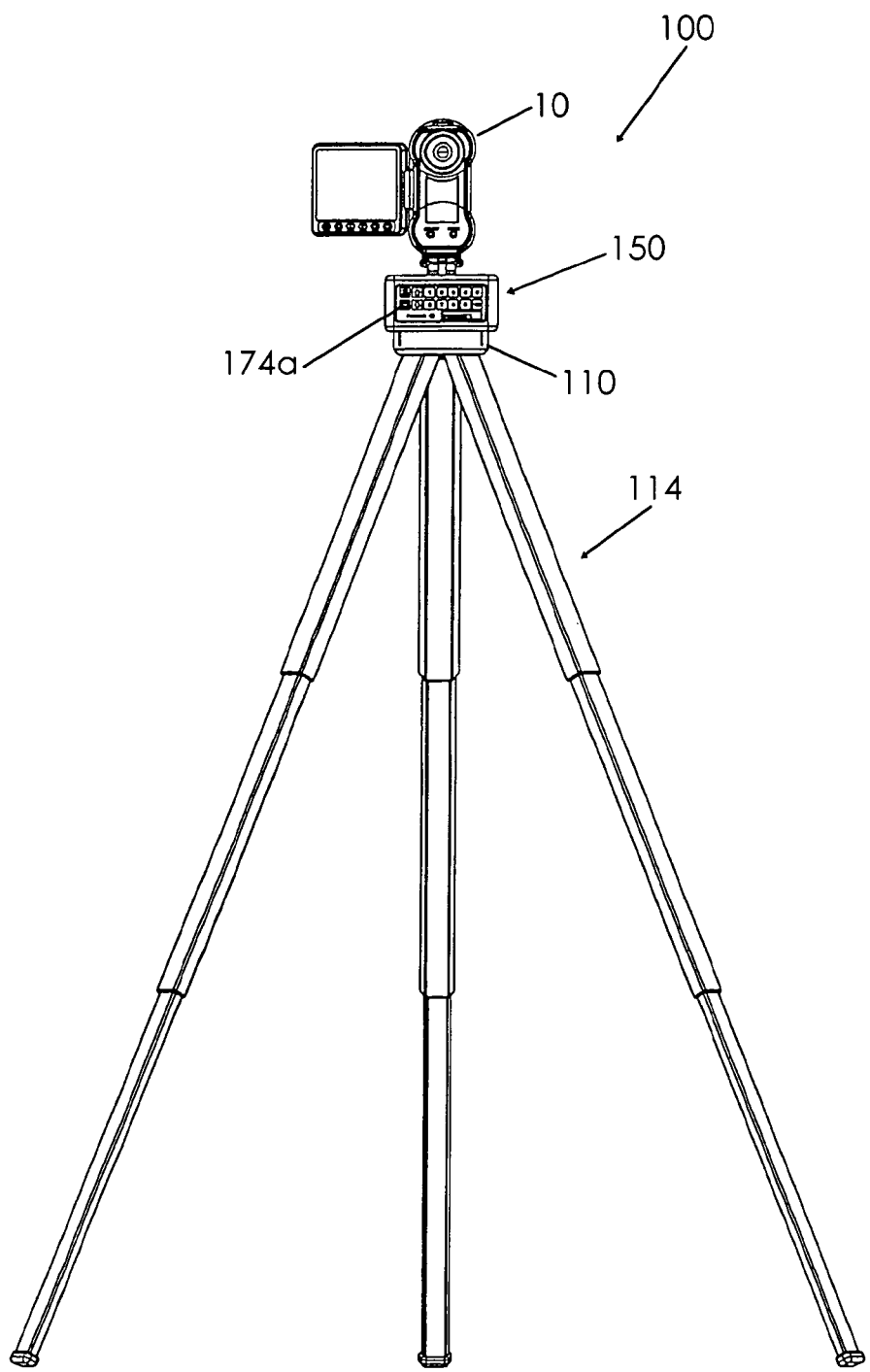
FIG. 1 is a perspective view of a tripod device and system for mounting a camera for tracking movable objects according to the present invention.
Figure 2:
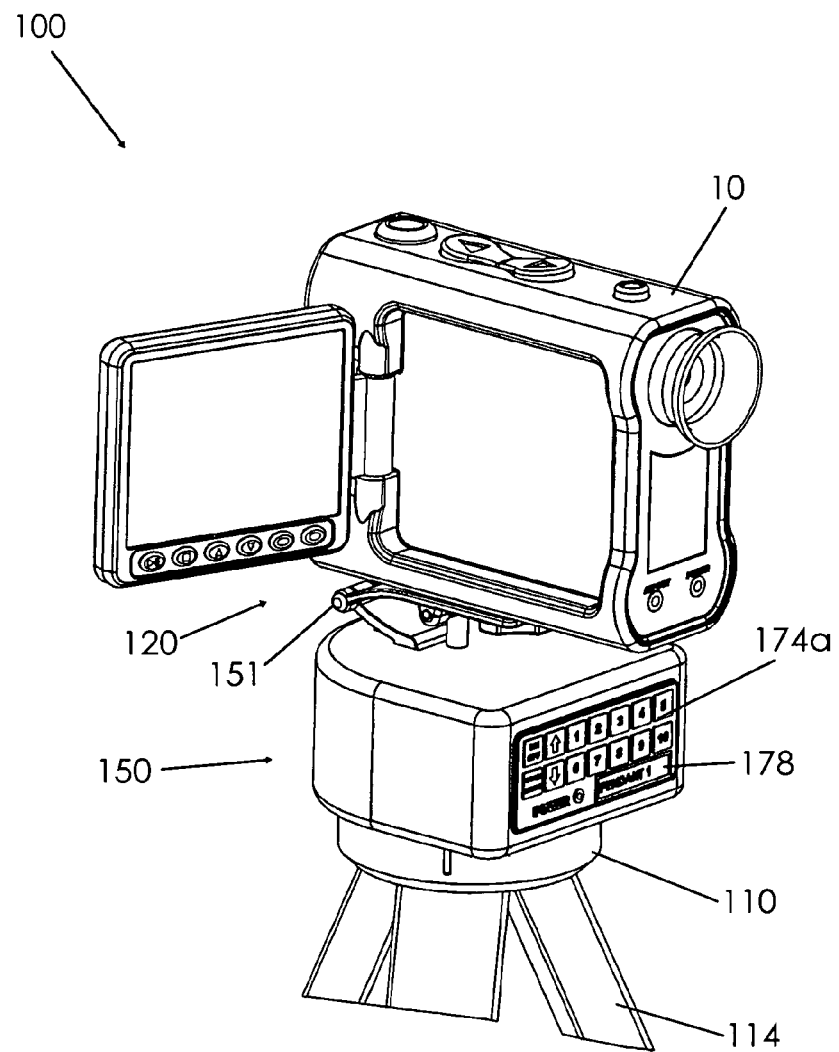
FIG. 2 is an enlarged fragmentary view of the tripod device as in FIG. 1.
Figures 3A, 3B:
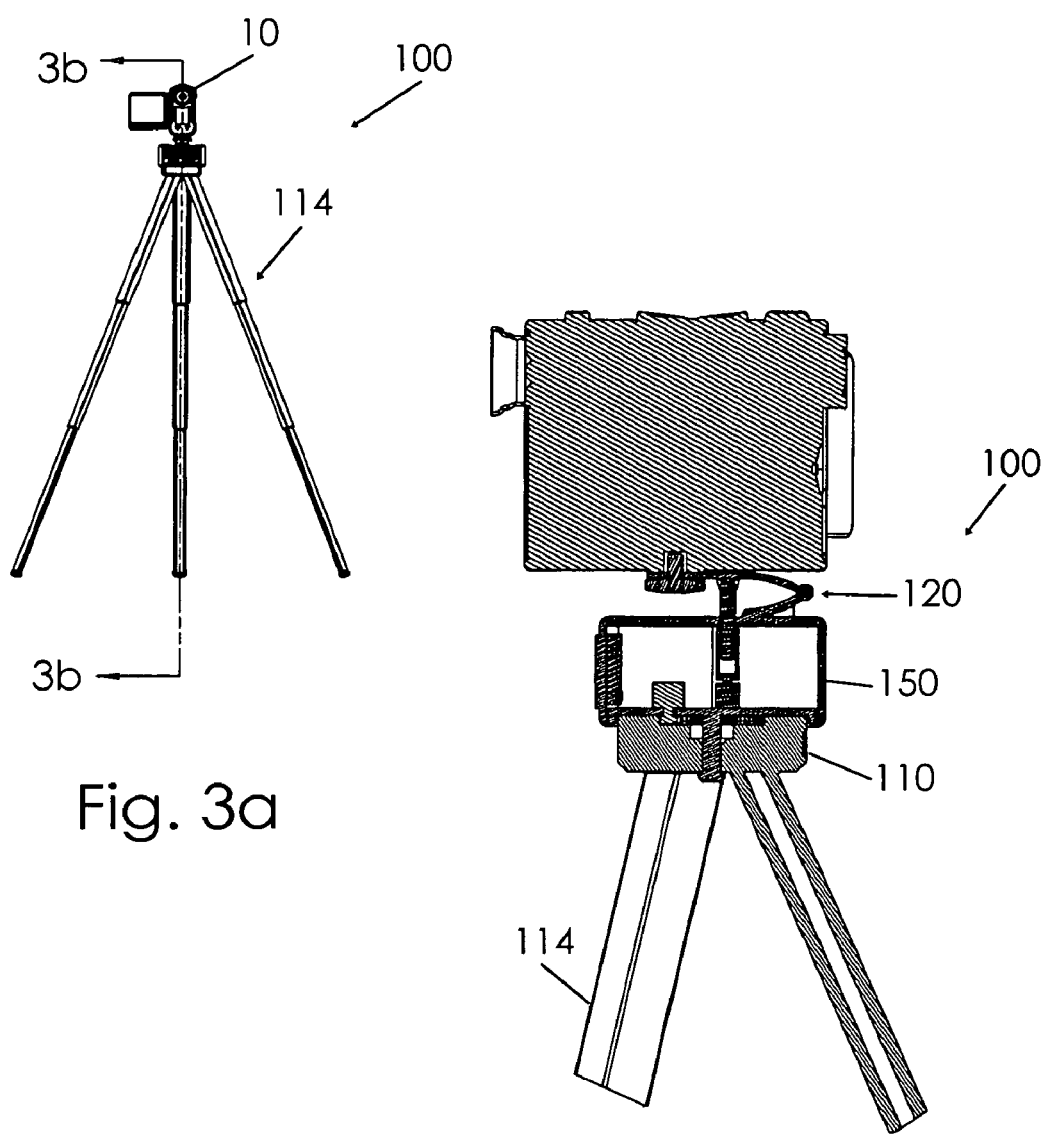
Figure 4A:
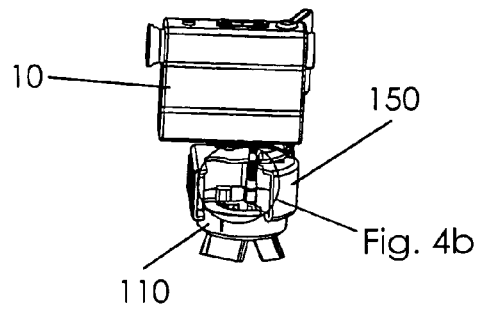
FIG. 4a is a side view of the tripod device as in FIG. 1 in one configuration with a wall of a housing partially removed.
Figure 4B:
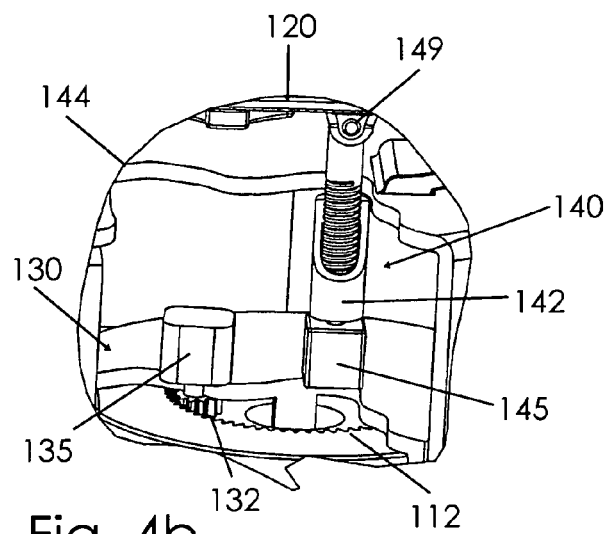
Figure 4C:
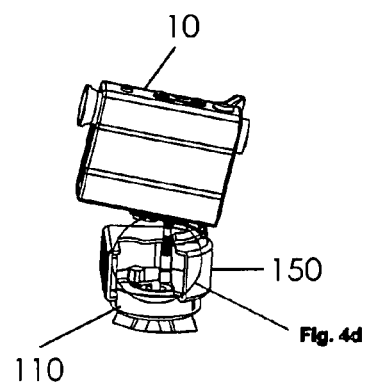
FIG. 4c is a side view of the tripod device as in FIG. 4a in a tilted configuration.
Figure 4D:
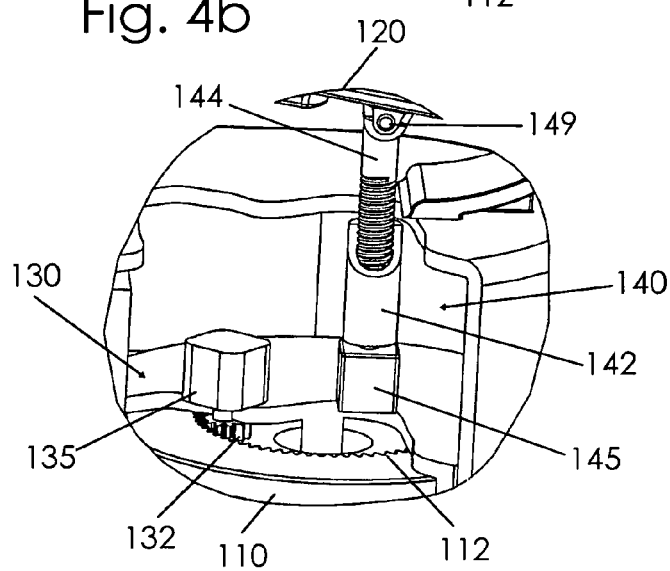
FIG. 4d is an isolated view on an enlarged scaled taken from FIG. 4c.

A first actuator 130 is included for moving the camera mount 120 relative to the base 110 in a rotational direction about a generally vertical axis. As shown in FIGS. 4b and 4d, the first actuator 130 may include a spur gear 132 powered by a motor 135. By configuring the spur gear 132 complimentary to an internal gear 112 defined by the base 110 (FIGS. 4b and 4d), movement of the spur gear 132 along the internal gear 112 may cause the camera mount 120 to move relative to the base 110 in a rotational direction about a generally vertical axis. Though not shown, other actuators 130 may also be used, including a rubberized wheel operatively connected to the camera mount 120 that moves along the base 110 through a frictional interaction, other gear trains, etc.

A second actuator 140 is included for tilting the camera mount 120 relative to the base 110 in a generally vertical direction. As shown in FIGS. 4b and 4d, the second actuator 140 may include a threaded collar 142, a threaded shaft 144 complimentary to the threaded collar 142, and a motor 145. The motor 145 may be operatively connected to either the collar 142 or the shaft 144 to cause the connected member (the collar 142 or the shaft 144) to rotate. The member (the collar 142 or the shaft 144) not connected to the motor 145 may be pivotably connected to the camera mount 120 as denoted by 149 in FIGS. 4b and 4d. Rotation of the connected member (the collar 142 or the shaft 144) may then cause the member (the collar 142 or the shaft 144) not connected to the motor 145 to extend from or retract along the connected member (the collar 142 or the shaft 144). This extension or retraction may cause the camera mount 120 to tilt in a vertical direction if the camera mount 120 is pivotably connected to a vertically-stationary object, such as the vertically-stationary housing 150 best shown in FIGS. 2, 3b, 4b, 4d, and 6. The pivotal connection between the camera mount 120 and the housing 150 is denoted 151 in the Figures. The tilting of the camera mount 120 relative to the base 110 may be seen in the Figures by comparing the position of the camera mount 120 in FIG. 4a to the position of the camera mount 120 in FIG. 4b. Also, other actuators 140 may be used, such as various gear trains, etc.

A plurality of pendants 160 (FIGS. 7-8b and 10-11b) separate from the base 110 and the camera mount 120 are included in the tripod device 110. Each pendant 160 has a transmitter 162 for transmitting signals different from signals transmitted by each other pendant 160, and each pendant 160 may also include a microphone 164 for capturing audio data. The signals transmitted by the pendant transmitters 162 may include audio data captured by the microphones 164. Further, each pendant 160 may have a receiver 166 for receiving signals different from signals received by each other pendant 160 and an indicator 168 (i.e., an LED) in communication with the receiver 166 for indicating when the receiver 166 is receiving signals. Each pendant 160 may also include a fastener 169 (i.e., a clip 169a or a strap 169b) that allows the pendant 160 to be fastened to a subject, such as a person. Each transmitter 160 may include its own power source 165 (i.e., a battery) for energizing its transmitter 162, microphone 164, receiver 166, and/or indicator 168.

A processor 170 is in communication with the first and second actuators 130, 140 for controlling the first and second actuators 130, 140. The processor 170 may also be in communication with a receiver 172, a user interface 174, a signal transmitter 176, and a display 178. The display 178 (i.e., a LCD display) may display information from the processor 170.

The receiver 172 receives signals from the pendant transmitters 162 and provides the signals to the processor 170. The processor 170 has programming for identifying the individual pendants 160 by their unique signals and determining a direction to each pendant 160 based on the signals. In various embodiments, the receiver 172 may be either a moving receiver 172 or a plurality of stationary receivers 172 with each receiver 172 being directed differently than each other receiver 172. The processor 170 may include programming for analyzing the signals received by the moving or stationary receivers 172 and determining a direction to each pendant 160 based on intensities of the signals.

Figure 10:
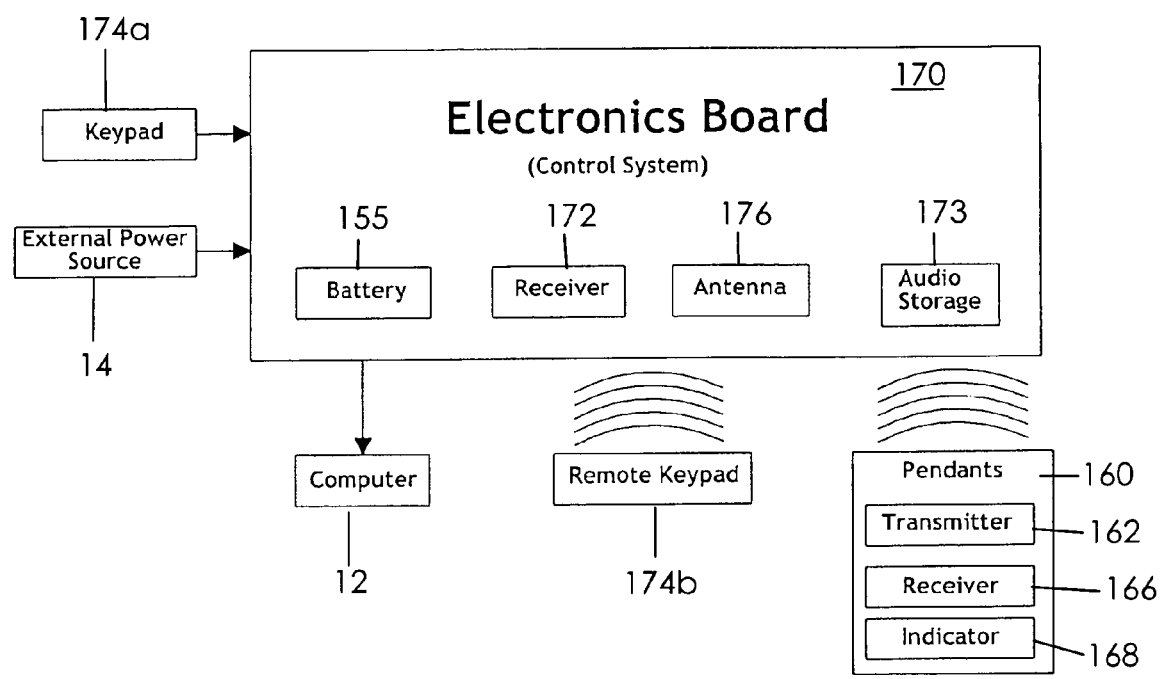
FIG. 10 is a block diagram schematically illustrating the electronic components of the tripod device according to the present invention.
Figure 11A:
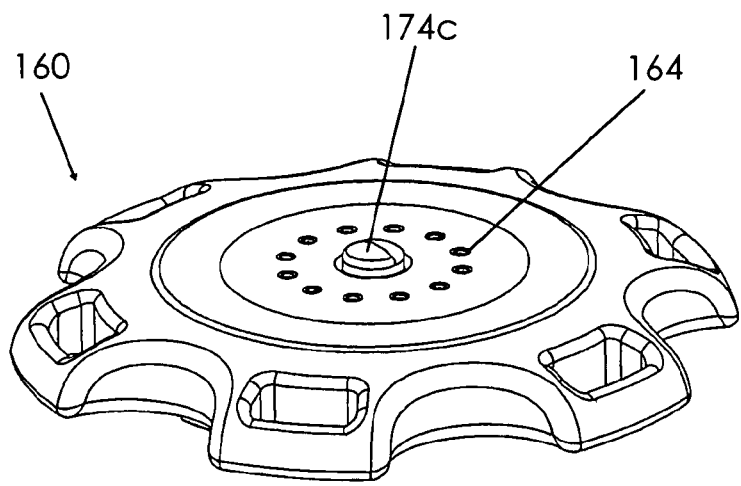
FIG. 11a is a perspective view of a pendant with the wrist straps removed.
Figure 11B:
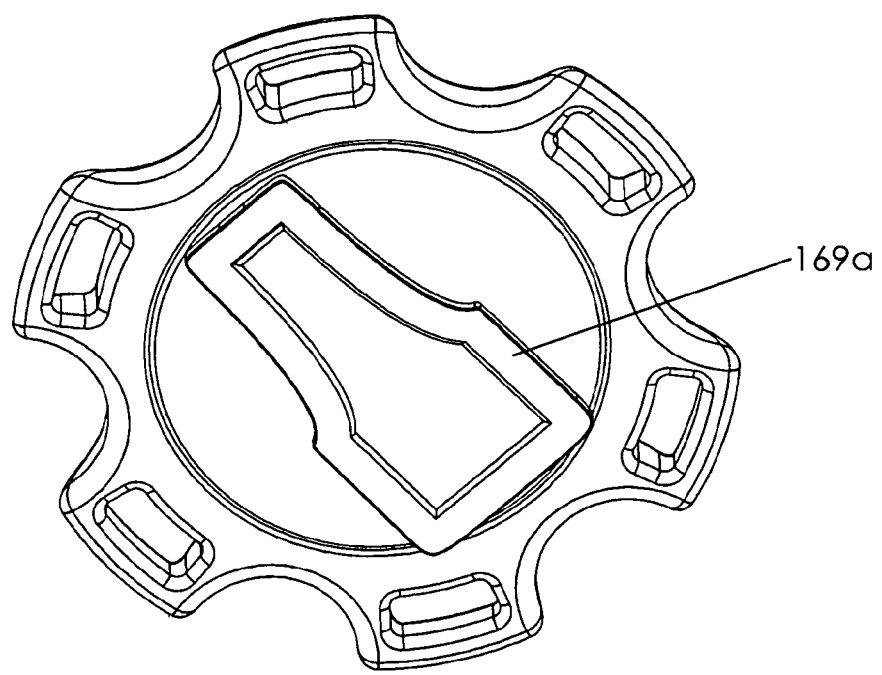

An audio storage unit 173 may be in communication with the receiver 172 for storing audio data captured by the microphones 164, transmitted by the pendant transmitters 162, and received by the receiver 172. The audio data may be used to later edit content captured by the camera 10, such as by using a computer 12 (FIG. 10). A data port 173a may be in communication with the audio storage unit 173 to selectively transfer the audio data through the data port 173a, such as to the computer 12.

The user interface 174 provides user input to the processor 170. The user interface 174 may be any convenient user interface, such as a keypad 174a adjacent the camera mount 120 (FIGS. 1, 2, and 6), a selection dial adjacent the camera mount 120, a switch adjacent the camera mount 120, a voice recognition system, a sound recognition system, and a remote control 174b (FIG. 10). The pendants 160 may be uniquely color coded, and the user interface 174 may include color coded input options corresponding to the color coded pendants 160 for easy and quick operation. For example, a blue button on the keypad 174a may correspond to a blue pendant 160. The user interface 174 may also include an override button 174c attached to each respective pendant 160 and in communication with each pendant's transmitter 162 for causing the transmitter 162 to transmit a unique override signal when the respective override button 174c is pressed. Among other things, the user input may include scan duration data and mode data corresponding to a plurality of tracking modes.

Figure 5:
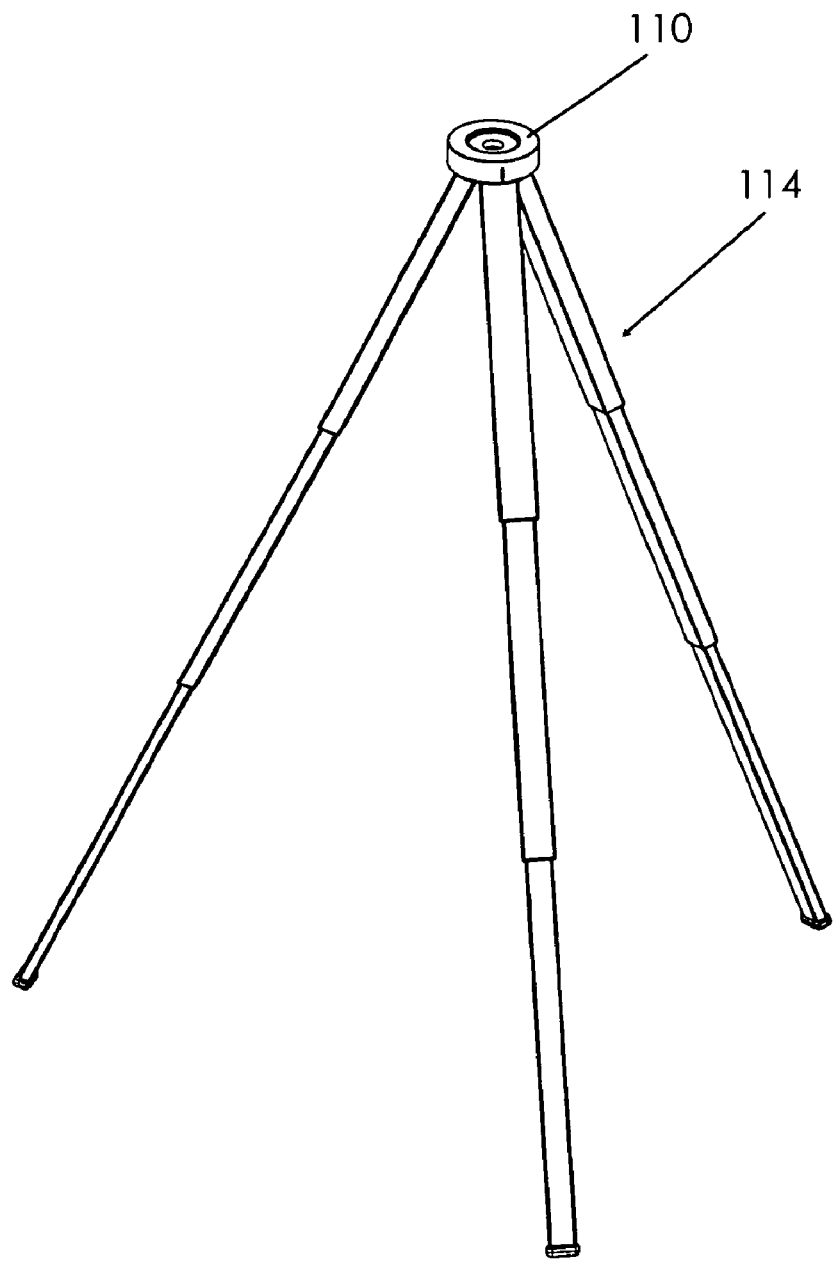
FIG. 5 is a perspective view of the tripod base with legs extended as in FIG. 1 with the camera mount and housing removed.
Figure 6:
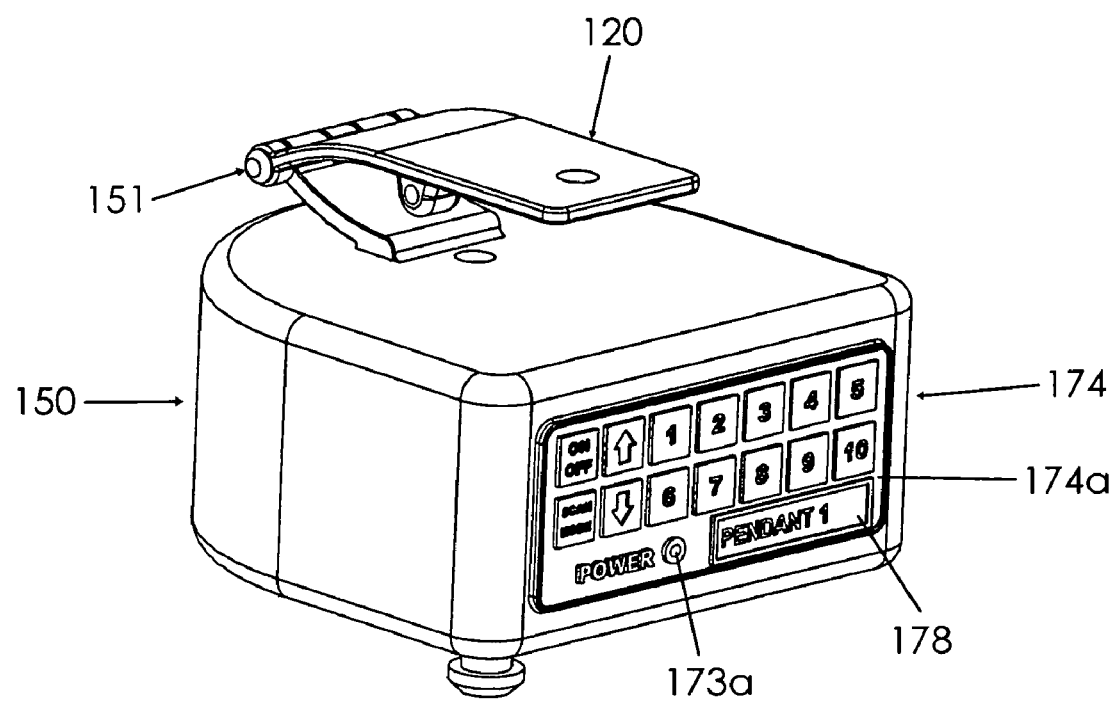
FIG. 6 is a perspective view on an enlarged scale of the housing, user interface, and camera mount as in FIG. 1.
Figure 7:
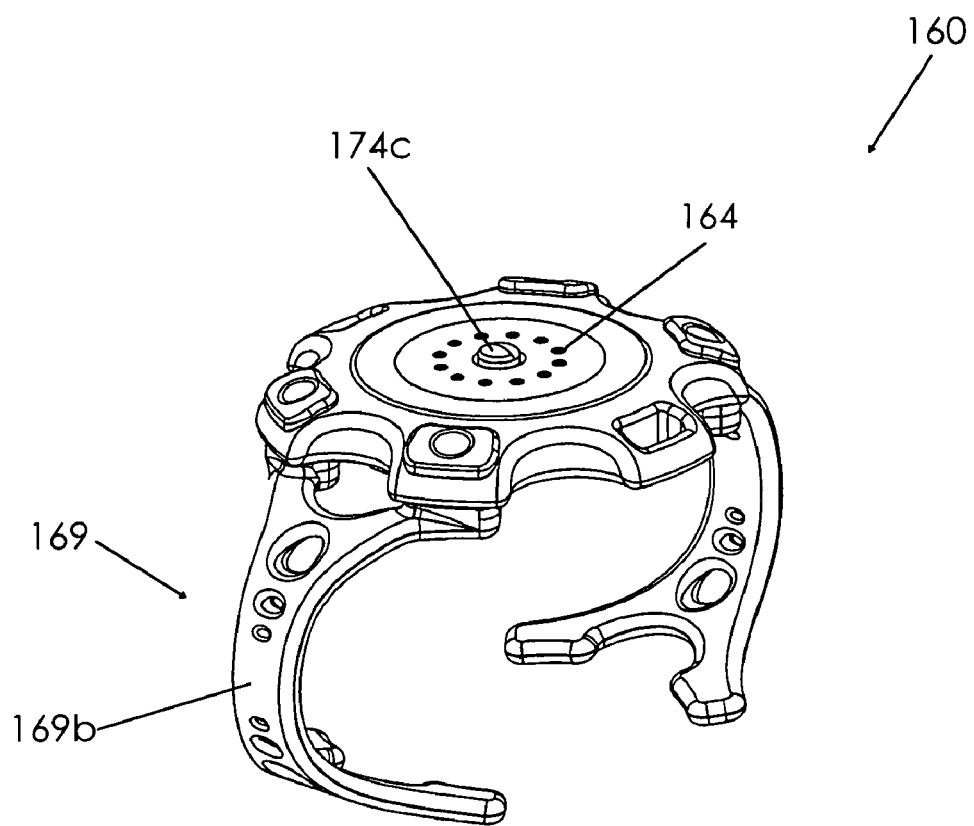
FIG. 7 is a perspective view of a pendant according to the present invention.
Figure 8A:
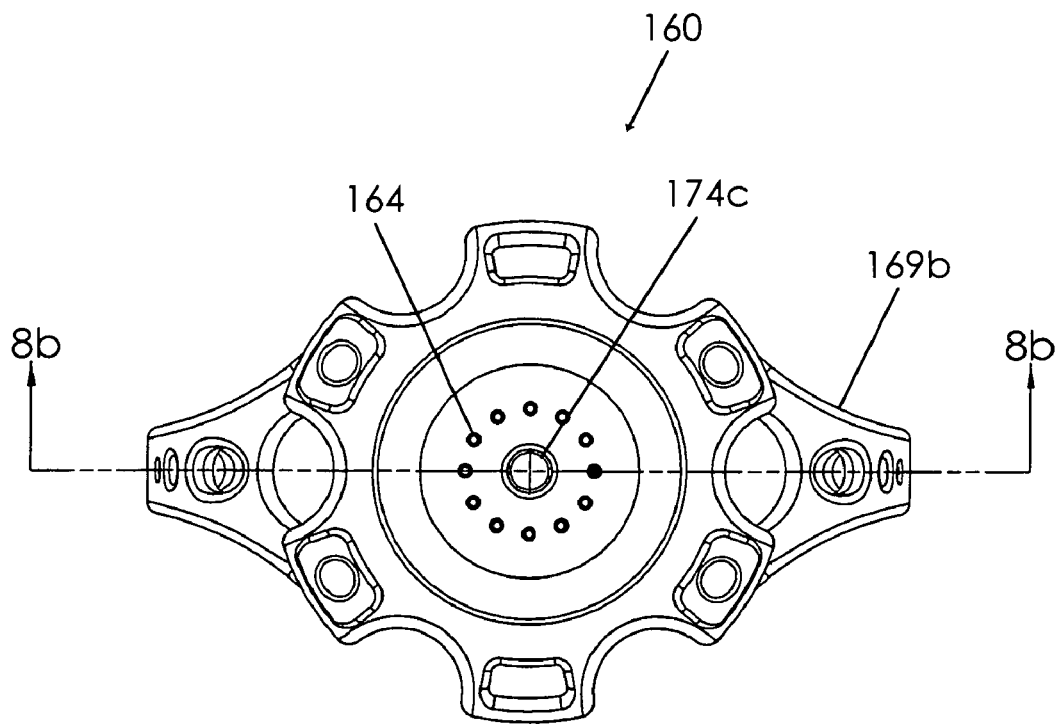
FIG. 8a is a top view of the pendant as in FIG. 7.
Figure 8B:
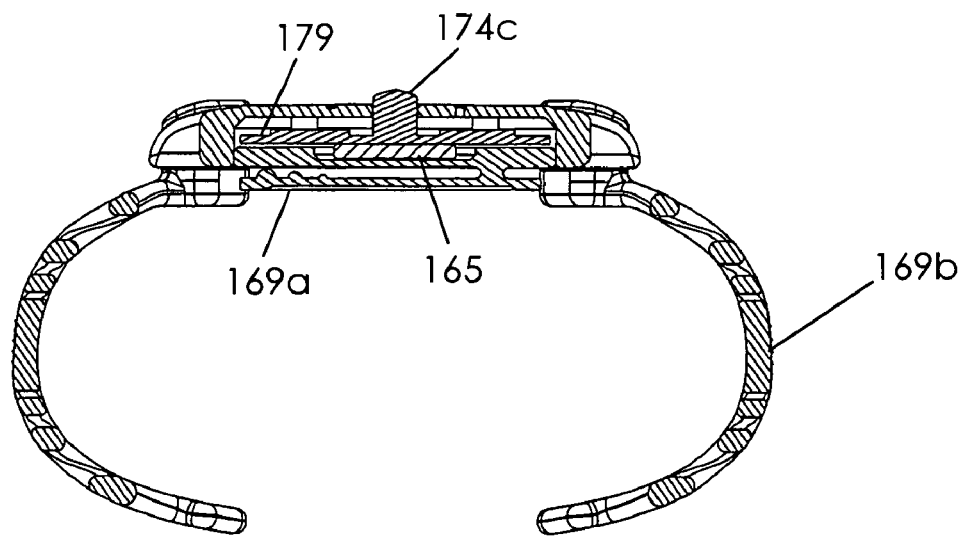

The housing 150 may be positioned between the base 110 and the camera mount 120 (FIGS. 1 through 4d), and the housing 150 may be separable from the base 110, as shown in FIGS. 5 and 6. FIG. 5 also shows that a plurality of adjustable legs 114 may extend downwardly from the base 110. The housing 150 may contain the first and second actuators 130, 140, the processor 170, the receiver 172, the audio storage unit 173, and/or the transmitter 176. It is also to be understood that the processor 170, the first and second actuators 130, 140, the receiver 172, the transmitter 176, and the display 178 are in communication with one or more power sources, such as a battery 155 or an external power source 14 (FIG. 10). The external power source 14 may provide AC or DC power, and the battery 155 may be housed in the housing 150.

The processor 170 may include programming for selectively controlling the first and second actuators 130, 140 to track the pendants 160 according to the user input provided through the user interface 174. This user input may include mode data corresponding to a plurality of tracking modes as noted above. The tracking modes may include, among others, following a single selected pendant 160, scanning between two or more pendants 160 in a repeating sequence, concentrating on an area containing a largest number of pendants 160, and following pendants 160 based on the audio data noted above. As such, the processor 170 may include programming for selectively controlling the first and second actuators 130, 140 to follow a single selected pendant 160, scan between two or more pendants 160 in a repeating sequence, concentrate on an area containing a largest number of pendants 160, and follow pendants 160 based on audio data. The programming for scanning between two or more pendants 160 in a repeating sequence may include programming for selectively controlling the first and second actuators 130, 140 to scan between two or more pendants 160 in a repeating sequence based on the scan duration data noted above. The processor 170 may also include programming for exiting a previous mode and selectively controlling the first and second actuators 130, 140 to follow a pendant 160 that transmitted a unique override signal (as noted above) when the receiver 172 provides the unique override signal to the processor 170. Further, the processor 170 may include programming for actuating the signal transmitter 176 to transmit signals to respective pendants 160 as the respective pendants 160 are the subject of a respective tracking mode. This in turn causes the respective pendant indicators 168 to indicate that the respective pendant receivers 166 are receiving signals as discussed above.

To even better describe the various programming and function of the processor 170 and system, the flowchart of FIG. 9 will now be described. First, a user may activate the system by pressing an appropriate button on the keypad 174*a*, as denoted at 180. The system automatically places itself into Scan Mode at 182, in which the receiver 172 is readied to receive signals from pendants 160. If a user indicates a desire to indicate which pedants 160 will be actively tracked, as denoted at 184, then the user may press appropriate buttons on the keypad 174*a* indicative of active pendants and these will be remembered by the processor 170, as denoted by 186. This feature enables a user to limit which pendants will be tracked even if other pendants are activated. If, however, the user does not wish to select active pendants, the user may select which scanning mode to actuate, as shown at 188. One mode choice that is selectable is Exclusive Mode 190 in which a particular pendant is selected 192 to be the exclusive subject for tracking, such as the red pendant. Another selectable mode is Scan All 194 in which all pendants will consecutively and repeatedly become tracking subjects according to a user selectable time frequency 196. Another scanning mode option is the Voice Priority mode 198. In this mode, the tripod with camera is programmed to follow a pendant that is presently transmitting an audio signal. Still another scanning mode is the Center Group mode 200 in which the tripod attempts to focus on the entire group of pendants or at least on an area having the largest density of active pendants.

Figure 9:
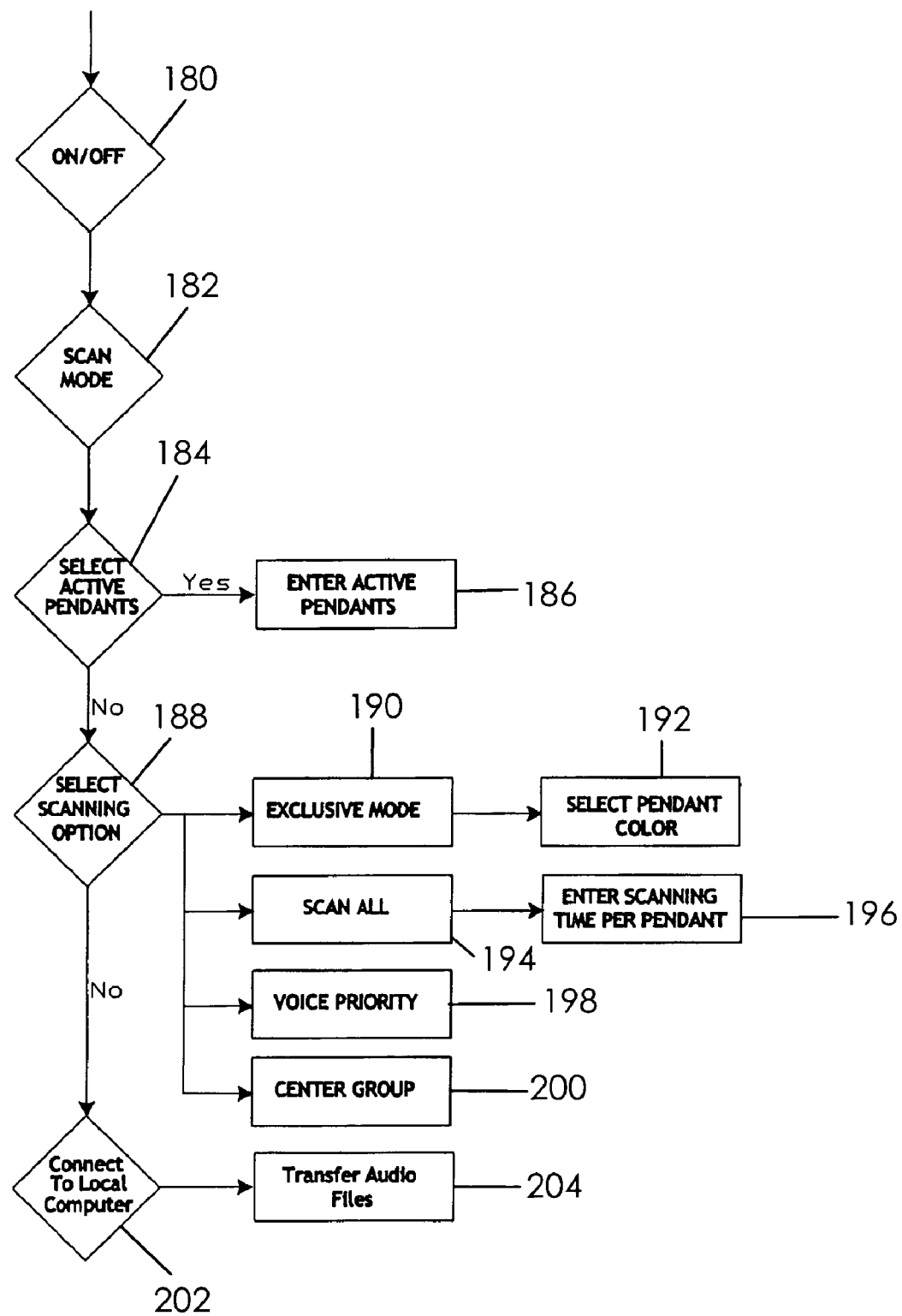
FIG. 9 is a flowchart illustrating the logic performed by the processor according to the present invention.

If no scanning mode option was desired at 188, a user has an option of connecting the device and system to a local computer 12, as denoted at 202 (FIG. 9). According to this feature, audio files recorded by the camera and stored in the audio storage unit 173 in communication with the processor 170 may be transferred 204 to a computer 12 for editing or archival storage 204.

It is understood that while certain forms of this invention have been illustrated and described, it is not limited thereto except insofar as such limitations are included in the following claims and allowable functional equivalents thereof.

What is claimed is as follows:

1. A tripod device for mounting a camera to track movable objects, comprising:
   a base;
   a camera mount adjacent said base for selectively supporting the camera;
   a first actuator for moving said camera mount relative to said base in a rotational direction about a generally vertical axis;
   a second actuator for tilting said camera mount relative to said base in a generally vertical direction;
   a plurality of pendants separate from said base and said camera mount, each said pendant having a transmitter for transmitting signals different from signals transmitted by each other pendant;
   a processor in communication with said first and second actuators for controlling said first and second actuators;
   a receiver in communication with said processor for receiving said signals and providing said signals to said processor, said processor having programming for identifying said individual pendants by said signals, said processor having programming for determining a direction to each said pendant;
   a user interface in communication with said processor for providing user input to said processor, said processor having programming for selectively controlling said first and second actuators to track said pendants according to said user input;
   wherein:
   said user input includes mode data corresponding to a plurality of tracking modes;
   said processor includes programming corresponding to said plurality of tracking modes, including programming for selectively controlling said first and second actuators to:
   follow a single selected pendant;
   scan between two or more pendants in a repeating sequence; and
   concentrate on an area containing a largest number of said pendants.

2. The tripod device as in claim 1, wherein:
   said user input includes scan duration data; and
   said programming for selectively controlling said first and second actuators to scan between two or more pendants in a repeating sequence includes programming for selectively controlling said first and second actuators to scan between two or more pendants in a repeating sequence based on said scan duration data.

3. The tripod device as in claim 1, wherein:
   said user interface includes an override button attached to each respective pendant and in communication with each respective pendant's transmitter for causing the respective transmitter to transmit a unique override signal when the respective override button is pressed; and
   said processor includes programming for exiting a previous mode and selectively controlling said first and second actuators to follow a respective pendant that transmitted a unique override signal when said receiver provides said unique override signal to said processor.

4. The tripod device as in claim 1 wherein:
   each said pendant includes a microphone for capturing audio data;
   said signals transmitted by said pendant transmitters include said audio data; and
   said programming corresponding to said plurality of tracking modes further includes programming for selectively controlling said first and second actuators to follow said pendants based on said audio data.

5. The tripod device as in claim 4, wherein:
each said pendant includes a fastener selected from the group consisting of a clip and a strap;
each said pendant includes a receiver for receiving signals different from signals received by each other pendant;
a signal transmitter is in communication with said processor;
said processor includes programming for actuating said signal transmitter to transmit signals to respective pendant receivers as the respective pendants are subjects of a respective said tracking mode; and
each said pendant has an indicator in communication with said pendant receiver for indicating when said pendant receiver is receiving said signals.

6. The tripod device as in claim 5, wherein:
said user interface includes an override button attached to each respective pendant and in communication with each respective pendant's transmitter for causing the respective transmitter to transmit a unique override signal when the respective override button is pressed; and
said processor includes programming for exiting a previous mode and selectively controlling said first and second actuators to follow a respective pendant that transmitted a unique override signal when said receiver provides said unique override signal to said processor.

7. The tripod device as in claim 4, further comprising:
an audio storage unit in communication with said receiver for storing said audio data to be used in editing content captured by the camera; and
said audio storage unit is in communication with a data port for selectively transferring said audio data through said data port.

8. The tripod device as in claim 1, wherein:
a plurality of adjustable legs extend downwardly from said base;
a housing contains said first and second actuators, said processor, and said receiver; and
said base is selectively separable from said housing.

9. The tripod device as in claim 1, wherein:
each respective transmitter is in communication with a respective power source; and
said processor, said first and second actuators, said receiver, and said user interface are in communication with one or more other power sources.

10. The tripod as in claim 1, wherein said user interface is selected from the group consisting of a keypad adjacent said camera mount, a selection dial adjacent said camera mount, a switch adjacent said camera mount, a voice recognition system, a sound recognition system, and a remote control.

11. The tripod device as in claim 1, further comprising a display in communication with said processor for displaying information from said processor.

12. The tripod device as in claim 1, wherein:
said pendants are uniquely color coded; and
said user interface includes color coded input options corresponding to said color coded pendants.

13. The tripod device as in claim 1, wherein:
said first actuator includes a spur gear powered by a motor; and
said spur gear is configured complimentary to an internal gear defined by said base, whereby movement of said spur gear along said internal gear causes said camera mount to move relative to said base in a rotational direction about said generally vertical axis.

14. A camera support device, comprising:
abase;
a camera mount adjacent said base for selectively supporting a camera, said camera mount being movable relative to said base;
means for moving said camera mount rotationally about a generally vertical axis;
means for tilting said camera mount in a generally vertical direction;
a plurality of pendants separate from said base and said camera mount, each pendant having a transmitter for transmitting signals different from signals transmitted by each other pendant;
a processor in communication with said means for moving said camera mount and said means for tilting said camera mount for controlling said means for moving said camera mount and said means for tilting said camera mount;
a user interface in communication with said processor for providing user input to said processor;
a receiver in communication with said processor for receiving said signals and providing said signals to said processor;
said processor including programming for identifying said individual pendants by said signals;
said processor including programming for determining a direction to each said pendant;
said processor including programming for selectively controlling said means for moving said camera mount and said means for tilting said camera mount to track said pendants according to modes corresponding to said user input;
wherein said modes include:
  following a single selected pendant;
  scanning between two or more pendants in a repeating sequence; and
  concentrating on an area containing a largest number of said pendants.

15. The camera support device as in claim 14 wherein:
each pendant includes a microphone for capturing audio data;
said signals transmitted by said pendant transmitters include said audio data; and
said modes further include following said pendants based on said audio data.

* * * * *